United States Patent
Li et al.

(10) Patent No.: US 9,060,305 B2
(45) Date of Patent: Jun. 16, 2015

(54) METHOD AND APPARATUS FOR REPORTING RADIO BEARER LOSS INFORMATION

(71) Applicant: Huawei Technologies Co., Ltd., Shenzhen, Guangdong (CN)

(72) Inventors: Yan Li, Shenzhen (CN); Fenqin Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 12 days.

(21) Appl. No.: 13/727,261

(22) Filed: Dec. 26, 2012

(65) Prior Publication Data

US 2013/0114417 A1    May 9, 2013

Related U.S. Application Data

(63) Continuation of application No. PCT/CN2010/076194, filed on Aug. 20, 2010.

(51) Int. Cl.
*H04L 12/26* (2006.01)
*H04W 24/10* (2009.01)
(Continued)

(52) U.S. Cl.
CPC ............... *H04W 24/10* (2013.01); *H04W 4/12* (2013.01); *H04W 28/04* (2013.01); *H04W 28/26* (2013.01); *H04W 72/0413* (2013.01); *H04W 88/16* (2013.01)

(58) Field of Classification Search
USPC ......... 370/329, 328, 331, 242, 253, 251, 230; 455/436; 709/228
See application file for complete search history.

(56) References Cited

U.S. PATENT DOCUMENTS

| | | | | |
|---|---|---|---|---|
| 8,311,542 | B2 * | 11/2012 | Persson et al. | ................ 455/436 |
| 2008/0132269 | A1 * | 6/2008 | Shen et al. | ................ 455/550.1 |

(Continued)

FOREIGN PATENT DOCUMENTS

| | | |
|---|---|---|
| CN | 101127610 A | 2/2008 |
| CN | 101478742 A | 7/2009 |

(Continued)

OTHER PUBLICATIONS

"TS 123 203—Digital cellular telecommunications system (Phase 2+); Universal Mobile Telecommunications System (UMTS); LTE; Policy and charging control architecture (3GPP TS 23.203 version 8.10.0 Release 8)," 3GPP Technical Specification, Jun. 2010, V8.10.0, 3GPP, Valbonne, France.

(Continued)

*Primary Examiner* — Ian N Moore
*Assistant Examiner* — Phong La
(74) *Attorney, Agent, or Firm* — Leydig, Voit & Mayer, Ltd.

(57) ABSTRACT

A method for reporting radio bearer loss information is provided in an embodiment of this invention. The method comprises: receiving a User Equipment UE Context Release Request message or a Release Access Bearer Request message or an Iu interface release request message all carrying a release cause value; and if the release cause value indicates an abnormal release, reporting radio bearer loss information to a gateway while preserving non-GBR bearers. With the method and apparatus of embodiments of this invention, not only bearer reporting can be realized, but also problems caused by the release of Non-Guaranteed Bandwidth non-GBR bearers can be prevented.

12 Claims, 4 Drawing Sheets

(51) Int. Cl.
 *H04W 28/04* (2009.01)
 *H04W 4/12* (2009.01)
 *H04W 28/26* (2009.01)
 *H04W 72/04* (2009.01)
 *H04W 88/16* (2009.01)

(56) References Cited

U.S. PATENT DOCUMENTS

| | | | | |
|---|---|---|---|---|
| 2008/0232306 | A1* | 9/2008 | Kopplin et al. | 370/328 |
| 2008/0320149 | A1* | 12/2008 | Faccin | 709/228 |
| 2009/0129342 | A1* | 5/2009 | Hwang et al. | 370/331 |
| 2009/0239526 | A1* | 9/2009 | Zhao et al. | 455/424 |
| 2009/0245177 | A1* | 10/2009 | Zhao et al. | 370/328 |
| 2009/0262736 | A1* | 10/2009 | Zhao et al. | 370/389 |
| 2009/0320100 | A1 | 12/2009 | Kitazoe | |
| 2010/0043053 | A1* | 2/2010 | Wei et al. | 726/1 |
| 2010/0067400 | A1* | 3/2010 | Dolganow et al. | 370/253 |
| 2010/0257582 | A1* | 10/2010 | Castellanos Zamora et al. | 726/1 |
| 2010/0285803 | A1* | 11/2010 | Persson et al. | 455/436 |
| 2012/0039213 | A1* | 2/2012 | Cheng et al. | 370/254 |
| 2012/0044867 | A1* | 2/2012 | Faccin et al. | 370/328 |
| 2012/0170454 | A1* | 7/2012 | Takano et al. | 370/230 |
| 2012/0214492 | A1* | 8/2012 | Mihaly et al. | 455/437 |
| 2013/0070691 | A1* | 3/2013 | Ludwig et al. | 370/329 |

FOREIGN PATENT DOCUMENTS

| | | |
|---|---|---|
| CN | 101742576 A | 6/2010 |
| CN | 101772010 A | 7/2010 |

OTHER PUBLICATIONS

"TS 23.401—3rd Generation Partnership Project; Technical Specification Group Services and System Aspects; General Packet Radio Service (GPRS) enhancements for Evolved Universal Terrestrial Radio Access Network (E-UTRAN) access (Release 10)," 3GPP Technical Specification, Jun. 2010, V10.0.0, 3GPP, Valbonne, France.

$1^{st}$ Office Action in corresponding Chinese Patent Application No. 201080006021.4 (Dec. 3, 2012).

Search Report in corresponding Chinese Patent Application No. 201080006021.4 (Nov. 23, 2012).

International Search Report in corresponding International Patent Application No. PCT/CN2010/076194 (Jun. 9, 2011).

"S2-094763—Reply LS on EPS Bearer Deactivation," 3GPP TSG-SA WG2 Meeting #74, Jul. 6-10, 2009, 3GPP, Valbonne, France.

"S2-095809—EPS bearer preservation at S1 Release," 3GPP TSG-SA WG2 Meeting #75, Aug. 31-Sep. 4, 2009, CR 1247, Revision 1, V8.6.0, 3GPP, Valbonne, France.

"S2-102168—MME Release of Non-GBR Bearers," 3GPP TSG-SA WG2 Meeting #79, May 10-14, 2010, CR 1587, V9.4.0, 3GPP, Valbonne, France.

$2^{nd}$ Office Action in corresponding Chinese Patent Application No. 201080006021.4 (Jun. 18, 2013).

Written Opinion of the International Searching Authority in Corresponding PCT Patent Application No. PCT/CN2010/076194 (Jun. 9, 2011).

Extended European Search Report in corresponding European Patent Application No. 10847258.0 (Jul. 1, 2013).

"3GPP TSG-SA WG2 Meeting #78—$3^{rd}$ Generation Partnership Project; Change Request," Feb. 2010, S2-101772 (was S2-101598), Version 9.2.0, $3^{rd}$ Generation Partnership Project, Valbonne, France.

"3GPP TSG-SA WG2 Meeting #77—$3^{rd}$ Generation Partnership Project; Suspend trigger for CS fallback," Jan. 2010, S2-100374, Agenda item 4, 7.4.1, $3^{rd}$ Generation Partnership Project, Valbonne, France.

\* cited by examiner

METHOD AND APPARATUS FOR REPORTING RADIO BEARER LOSS INFORMATION

CROSS-REFERENCE TO RELATED APPLICATIONS

This application is a continuation of International Patent Application No. PCT/CN2010/076194, filed on Aug. 20, 2010, which is hereby incorporated herein by reference in its entirety.

FIELD OF THE INVENTION

The present invention relates to the communication field, and more specifically, to a method and apparatus for reporting radio bearer loss information.

BACKGROUND OF THE INVENTION

Bearers of next generation communication networks have been moving to IP (Internet Protocol, internet protocol) bearers. From the perspective of the development of communication networks, a progress, from traditional circuit switch networks to IP packet switching networks with control-bearer separation, and then to all IP multimedia networks, has been experienced. End-to-end QoS (Quality of Service, quality of service) issues have to be considered during the evolution to all IP networks to provide customer with satisfied services (particularly, real-time services). Because IP networks may provide more kinds of services (such as, multimedia call, file download, webpage browse, etc), it is necessary to enable networks to detect different service streams, perform statistics on charging information, such as traffic amount, duration etc, and report to charging centers. In order to solve the QoS and stream-based charging issues, a PCC (Policy and Charging Control, policy and charging control) framework has been defined by 3GPP (Third Generation Partnership Project, third generation partnership project). The networks are able to detect different service streams and QoS control, charging statistic and other requirements can be realized for those service streams through the framework.

In the PCC framework, a UE (User Equipment, user equipment) can establish an IP-CAN (IP-Connectivity Access network, IP-connectivity access network) session after assigned with an IP address which is addressable in the PDN (Public Data Network, public data network). In order to satisfy different QoS requirements, IP-CAN bearers (Bearer) with different QoS requirements can be established in a same IP-CAN session. For IP-CAN bearers, they can be categorized into GBR (Guaranteed Bandwidth, GBR) bearers and non-GBR bearers, wherein the default is non-GBR. In general, GBR bearers are used for bandwidth-sensitive real-time services, such as, VoIP (Voice over Internet Protocol, voice over internet protocol) media stream, video stream, etc; while non-GBR bearers are used for bandwidth-insensitive non-real time services and some real-time services having less bandwidth requirements, such as FTP (File Transfer Protocol, file transfer protocol) download, HTTP (Hyper Text Transfer Protocol, hypertext transfer protocol) browse, email (electronic mail, electronic mail), VoIP signaling stream etc.

Presently, operators can realize excellent control over QoS and charging etc for bearer-layer data streams through the PCC framework, to shield upward particular transport network details from the service layer and sense downward transport network resource usage. On one side, PCRF (Policy and Charging Rule Function, policy and charging rule function) may develop corresponding strategies according to session negotiation information indicated by the service layer to control bearer-layer network resource use; on the other side, when the use of underlying bearers has changed, for example, radio bearer loss due to a user entering a uncovered area, a gateway fault, etc, the service layer can be notified through a reporting mechanism, enabling the service layer to change accordingly, provide corresponding strategies.

However, in the prior art, when an eNB (eNodeB, Evolved Node B) needs to release the signaling connection with a UE and its all radio bearers, a PGW (PDN Gateway, Packet Data Network Gateway, packet data network gateway) is notified through a bearer release mechanism, thereby the PCRF and AF (Application Function, application function) are notified. For GBR (Guaranteed bandwidth, guaranteed bandwidth) bearers, since they are substantially adopted for real-time service transport, abnormally released radio bearers, even for a short time, may cause service interrupts, the release of GBR bearers is reasonable. However, for non-GBR bearers, adopting a mechanism releasing non-GBR bearers may affect other services bound to those non-GBR bearers, and lead to an IP address release defect caused by the release of default bearers.

SUMMARY OF THE INVENTION

A method and apparatus for reporting radio bearer loss information are provided in embodiments of this invention, for solving the problems of affecting services bound to other non-GBR bearers and IP address releasing due to the release of a default bearer, caused in a radio bearer loss information reporting mechanism realized through releasing non-GBR bearers after radio bearers are abnormally released.

The above objects of embodiments of this invention are realized through the following technical solutions:

a radio bearer loss information reporting method, said method comprises: receiving a User Equipment UE Context Release Request message or a Release Access Bearer Request message or an Iu Interface Release Request message all carrying a release cause value; if the release cause value indicates an abnormal release, reporting radio bearer loss information to a gateway while preserving Non-Guaranteed Bandwidth non-GBR bearers.

A Mobility Management Entity MME, said MME comprises: a receiving unit for receiving a UE Context Release Request message carrying a release cause value sent by an Evolved Node B eNB; a reporting unit for when the release cause value indicates an abnormal release, reporting a radio bearer loss information to a gateway; a processing unit for, when the release cause value indicates an abnormal release, preserving non-GBR bearers.

A Serving Gateway SGW, said SGW comprises: a receiving unit for receiving a Release Access Bearer Request message carrying a release cause value sent by a MME; a reporting unit for when the release cause value indicates an abnormal release, reporting radio bearer loss information to a PGW; a processing unit for when the release cause value indicates an abnormal release, preserving non-GBR bearers.

A Serving GPRS support Node SGSN, said SGSN comprises: a receiving unit for receiving an Iu Interface Release Request message carrying a release cause value sent by a Radio Network Controller RNC; a reporting unit for when the release cause value indicates an abnormal release, reporting radio bearer loss information to a gateway; a processing unit for when the release cause value indicates an abnormal release, preserving non-GBR bearers.

With the method and apparatus of the embodiments of this invention, not only the report of radio bearer loss information can be realized, but also problems caused by the release of non-GBR bearers can be avoided.

BRIEF DESCRIPTION OF THE DRAWINGS

Accompanying drawings described herein are given to provide a further understanding of this invention, which are part of this application, but are not limits of this invention, in which.

DETAILED DESCRIPTION OF THE EMBODIMENTS

In order to make the objects, technical solutions and advantages of embodiments of this invention clearer, in connection with embodiments and accompanying drawings, a more detailed description will be given to embodiments of this invention. Herein, illustrative embodiments of this invention and their description are merely for the explaining of this invention, but not limits of this invention.

Figure 1:
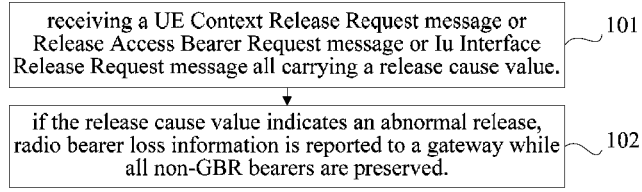
FIG. 1 is a flowchart of a method of reporting radio bearer loss information according to an embodiment of this invention.

FIG. 1 is a flowchart of a method of reporting radio bearer loss information provided in an embodiment of this invention. The method is applied on a network-side device, such as a MME (Mobile Management Entity, mobile management entity) or a SGW/SGSN (Service GPRS Supporting Node, service GPRS (General Packet Radio Service) supporting node), in which the MME/SGW/SGSN is responsible for the radio bearer loss information reporting. Referring to FIG. 1, the method comprises the following steps:

Step 101: receiving a UE Context Release Request message or Release Access Bearer Request message or Iu interface release request message all carrying a release cause value.

In one embodiment, when a device on the radio access network side (such as eNB) detects that it is necessary to release a radio signaling connection to a UE and all radio bearers, a UE Context Release Request message carrying a release cause value is transmitted to a network-side device (such as a MME), to notify the MME of the interruption of the radio connection to the UE. At that point, the MME will report radio bearer loss information after receiving the UE Context Release Request message.

In another embodiment, after receiving the UE Context Release Request message, instead of reporting radio bearer loss information, the MME will forward a release cause value to a SGW through a Release Access Bearer Request message, and the SGW then performs the reporting of radio bearer loss information.

In another embodiment, when a device on the radio access network side (such as RNC) detects that it is necessary to release a radio signaling connection to a UE and all radio bearers, an Iu interface release request message carrying a release cause value is transmitted to a network-side device (such as a SGSN), to notify the SGSN of the interruption of the radio connection to the UE. At that point, after receiving the Iu interface release request message, the SGSN will report radio bearer loss information.

Wherein, the release cause value is used to indicate the reason for the release, such as radio connection with UE lost, management maintenance cause, user inactivity, or repeated unsuccessful integrity checks with the UE, etc. When the release cause value is any one of radio connection with UE lost, management maintenance cause, or repeated unsuccessful integrity checks with the UE, etc, an abnormal release can be confirmed.

Step 102: if the release cause value indicates an abnormal release, radio bearer loss information is reported to a gateway while all non-GBR bearers are preserved.

Wherein, after the MME/SGW/SGSN has received a corresponding message carrying a release cause value, it is determined whether to report a radio bearer loss information according to the release cause value, if the release cause value indicates an abnormal release, that is, the release cause value is any one of the radio connection with US lost, the management maintenance cause, or the repeated unsuccessful integrity checks with the UE, a UE radio bearer loss information is reported to the gateway, while all non-GBR bearers are still preserved on the MME/SGW/SGSN.

For non-GBR services, not all of which may make services interrupted when radio bearers are released abnormally, such as HTTP, FTP, email, P2P (peer-to-peer, peer-to-peer), all of which can allow short transport interruption, especially for the case of restoring radio connection soon after entering an uncovered area occasionally by a UE. According to the current bearer binding mechanism, one bearer can be bound to several services with the same QoS requirements, and if some of the services take care of bearer events but others not, adopting the bearer release mechanism may cause those services taking no care of bearer events unable to transmit over the bearer (because the bearer has been released), even if these services can endure occasional interrupt. Further, for non-GBR services, concerning bearer events may not necessarily cause service interruption in abnormal radio bearer release.

Because the default bearer is non-GBR bearer, if such service necessarily taking care of bearer events is transmitted over a default bearer, adopting such a mechanism may release the default bearer, which in turn may cause the release of the whole IP-CAN session, including all bearers, and release its IP address, leading to the release of non-GBR bearers which are pre-labeled as pre-preserved. Further, after the release of the IP address, when the radio connection is restored again by the UE, an attaching process has to be performed and an IP address has to be assigned again, which may cause a large amount of signaling interactions, resulting to unnecessary signaling interactions.

With the method of reporting a radio bearer loss information provided in the embodiment of this invention, the problem of non-GBR bearer interrupting, no matter whether the service can endure bearer loss on the radio side, which is caused by adopting a bearer release mechanism for non-GBR bearers to notify a gateway after receiving a radio side bearer loss information by a network-side device MME/SGSN, and with a deployed PCC, notify the PCRF by the gateway; and the problem of IP address releasing due to the release of the default bearer and thus the requirement of reattachment, can be solved.

In order to make the method of the embodiment of FIG. 1 clearer, the method of this embodiment will be described in detail in connection with the flow shown in FIGS. 2 to 4.

Figure 2:
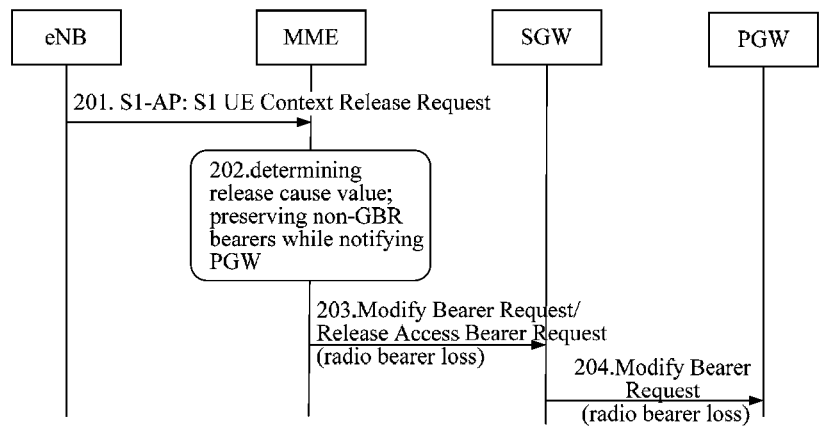
FIG. 2 is a flowchart of reporting radio bearer loss information by a MME according to the method shown in FIG. 1.

FIG. 2 is a flowchart of a method according to the embodiment, in which a MME is responsible for the reporting of radio bearer loss information. The embodiment directs to the EPS (Evolved Packet System) defined by the 3GPP standard organization, with eUTRAN (evolved universal terrestrial radio access network) as a radio access technique. Referring to FIG. 2, the flow comprises the following steps:

Step 201: if an eNB detects that it is necessary to release a signaling connection to a UE (user equipment) and all radio bearers, it sends S1 a UE Context Release Request (context release request) message to a MME.

Wherein, a release cause value is carried in the UE Context Release Request message, the release cause is used for indicating the reason for release, such as radio connection with US lost, management maintenance cause, user inactivity, or repeated unsuccessful integrity checks with the UE, etc. When the release cause value is any one of the radio connection with US lost, the management maintenance cause, or the repeated unsuccessful integrity checks with the UE, etc, an abnormal release can be confirmed.

Step 202: after receiving the UE Context Release Request message, the MME determine whether to report according to the release cause value. If it is an abnormal release, that is, the release cause value is any one of the radio connection with UE lost, the management maintenance cause, or the repeated unsuccessful integrity checks with the UE, etc, radio bearer loss information is reported to the gateway while all non-GBR bearers are still preserved.

Step 203: the MME sends a Modify Bearer Request (modify bearer request) message or a Release Access Bearer Request (release access bearer request) message to a SGW (servicing gateway), wherein the UE radio bearer loss information is carried in the message.

Wherein, the radio bearer loss information may be a general statement, i.e., without distinguishing particular release causes, or it may further carry a cause value, indicating the particular reason for the radio bearer loss. In this embodiment, the radio bearer loss information directs to all non-GBR bearers of the UE, but not one specific non-GBR bearer.

Step 204: after the SGW has received the Modify Bearer Request message or the Release Access Bearer Request message, and the SGW report the UE radio bearer loss information to a PGW (PDN gateway) through a Modify Bearer Request (modify bearer request) message if UE radio bearer loss information is carried in the message is reported.

Thus, the MME completes the reporting of the radio bearer loss information, by which the problems of non-GBR bearer interrupting, no matter whether the service can endure bearer loss on the radio side, which is caused by adopting a bearer release mechanism for non-GBR bearers to notify a gateway after receiving a radio bearer loss information by a network-side device MME, and with a deployed PCC, notify the PCRF by the gateway; and of IP address releasing due to the release of the default bearer and thus the requirement of reattachment, can be solved.

Figure 3:
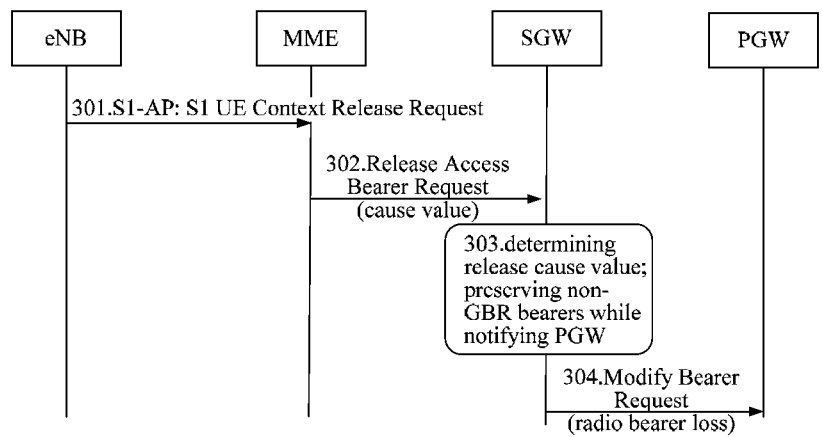
FIG. 3 is a flowchart of reporting radio bearer loss information by a SGW according to the method shown in FIG. 1.

FIG. 3 is a flowchart of a method according to the embodiment, in which a SGW is responsible for the reporting of radio bearer loss information. The embodiment directs to the EPS (Evolved Packet System) defined by the 3GPP standard organization, with eUTRAN as a radio access technique. Referring to FIG. 3, the flow comprises the following steps:

Step 301: if an eNB detects that it is necessary to release a signaling connection to a UE (User Equipment) and all radio bearers, it sends a S1 UE Context Release Request (context release request) message to a MME.

Wherein, a release cause value is carried in the UE Context Release Request message, to indicate the reason for release, such as the radio connection with UE lost, the management maintenance cause, user inactivity, and the repeated unsuccessful integrity checks with the UE, etc. When the release cause value is any one of radio connection with UE lost, management maintenance cause, or repeated unsuccessful integrity checks with the UE, etc, an abnormal release can be confirmed.

Step 302: the MME sends a Release Access Bearer Request (release access bearer request) message to a SGW (servicing gateway), wherein a release cause (cause) value is carried in the message, to request the SGW to release the connection to the access network device.

Step 303: the SGW receives the Release Access Bearer Request message, and determines whether to report according to the release cause value. If it is an abnormal release, that is, when the release cause value is any one of the radio connection with UE lost, the management maintenance cause, or the repeated unsuccessful integrity checks with the UE, etc, a radio bearer loss information is reported to a PGW while all non-GBR bearers are still preserved.

Step 304: the SGW sends a Modify Bearer Request (modify bearer request) message to a PGW (PDN GW), wherein the UE radio bearer loss information is carried in the message.

Wherein, the radio bearer loss information may be only a general statement, i.e., without distinguishing particular release causes, or it may further carry a cause value, indicating the particular reason for the radio bearer loss. In this embodiment, the radio bearer loss information directs to all non-GBR bearers of the UE, but not one specific non-GBR bearer.

Thus, the SGW completes the reporting of the radio bearer loss information, by which the problems of non-GBR bearer interrupting, no matter whether the service can endure bearer loss on the radio side, which is caused by adopting a bearer release mechanism for non-GBR bearers to notify a gateway after receiving a radio bearer loss information by a network-side device MME, and with a deployed PCC, notify the PCRF by the gateway; and of IP address releasing due to the release of the default bearer and thus the requirement of reattachment, can be solved.

Figure 4:
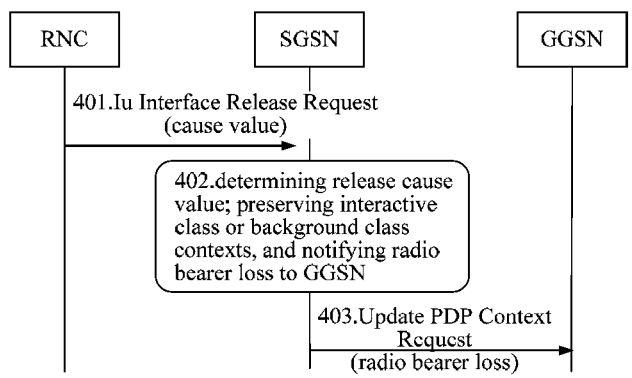
FIG. 4 is a flowchart of reporting radio bearer loss information by a SGSN according to the method shown in FIG. 1.

FIG. 4 is a flowchart of a method according to the embodiment, in which a SGSN is responsible for the reporting of radio bearer loss information. The embodiment directs to the GPRS (General Packet Radio Service) system defined by the 3GPP standard organization, with GERAN (GSM EDGE (Enhanced Data rate for GSM Evolution, enhanced data rate for GSM evolution) Radio Access Network, GSM/EDGE radio access network)/UTRAN (UMTS Terrestrial Radio Access Network, UMTS terrestrial radio access network)/GSM (Global System for Mobile Communications, global system for mobile communications)) as a radio access technique. Referring to FIG. 4, the flow comprises the following steps:

Step 401: If a RNC detects a RRC (Radio Resource Control, radio resource control) connection between the RNC and a UE that has been released or needs to be released, or if the RNC detects that radio resources associated with a UE need to be released, the RNC sends an Iu Interface Release Request (interface release request) message to a SGSN.

Wherein, the Iu interface release request message carries with a release cause value (cause), such as the radio connection with UE lost, the management maintenance cause, user inactivity, and the repeated unsuccessful integrity checks with the UE, etc. When the release cause value is any one of the radio connection with UE lost, the management maintenance cause, or the repeated unsuccessful integrity checks with the UE, etc, an abnormal release can be confirmed.

Step 402: the SGSN receives the Iu interface release request message, and determines whether to report according to the release cause value. If it is an abnormal release, that is, when the release cause value is any one of the radio connection with UE lost, the management maintenance cause, or the repeated unsuccessful integrity checks with the UE, etc, a radio bearer loss information is reported to a GGSN while all background class PDP (Packet Data Protocol, packet data protocol) contexts or all interactive class PDP contexts or all background class and interactive class PDP contexts are still preserved (background class and interactive class PDP contexts also are non-GBR bearers).

Step 403: the SGSN sends an update PDP context request (Update PDP Context Request) message to the GGSN, wherein the UE radio bearer loss information is carried in the message.

Wherein, the radio bearer loss information may be a general statement, i.e., without distinguishing particular release causes, or it may further carry a cause value, indicating a particular cause of the radio bearer loss. In this embodiment, the radio bearer loss information directs to all background class PDP contexts or all interactive class PDP contexts or all background class and interactive class PDP contexts of the UE, but not one specific non-GBR bearer.

According to existing standards, the Update PDP Context Request message must specify a PDP context ID, which, in this embodiment, is a primary context ID. However, it not intended to demonstrate that radio bearer loss is merely direct to primary on texts.

Thus, the SGSN completes the reporting of the radio bearer loss information, by which the problems of non-GBR bearer interrupting, no matter whether the service can endure radio-side bearer loss, which is caused by adopting a bearer release mechanism for non-GBR bearers to notify a gateway after receiving a radio bearer loss information by a network-side device SGSN, and with a deployed PCC, notify the PCRF by the gateway; and of IP address releasing due to the release of the default bearer and thus the requirement of reattachment, can be solved.

Figure 5:
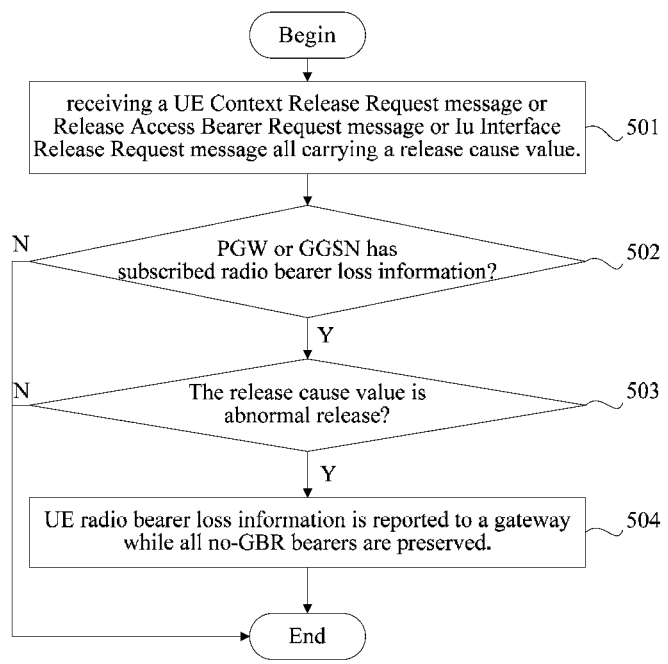
FIG. 5 is a flowchart of a method of reporting radio bearer loss information according to another embodiment of this invention.

FIG. 5 is a flowchart of a method of reporting a radio bearer loss information provided in an embodiment of this invention, which is also applied on a network-side device MME/SGSN/SGW, in the case that a PDN gateway PGW/GGSN in advance has subscribed a radio bearer loss information from the network-side device, the radio bearer loss information is reported to the PGW through the MME/SGW. Wherein, content of this embodiment that is the same as the embodiment shown in FIG. 1 will not be described in detail. Referring to FIG. 5, the method comprises the following steps:

Step 501: receiving a UE Context Release Request message or Release Access Bearer Request message or Iu Interface Release Request message, wherein a release cause value is carried in these message.

Wherein, the release cause value is used to indicate a release cause, such as radio connection with UE lost, management maintenance cause, user inactivity, or repeated unsuccessful integrity checks with the UE, etc. When the release cause value is any one of the radio connection with UE lost, the management maintenance cause, or the repeated unsuccessful integrity checks with the UE, etc, an abnormal release can be confirmed.

Step 502: determining whether a PGW or GGSN has subscribed radio bearer loss information, and if so, proceeds step 503 is performed, otherwise the process ends.

In this embodiment, it is the MME/SGW that determines whether the PGW has subscribed radio bearer loss information, and it is the SGSN that determine whether the GGSN has subscribed radio bearer loss information.

Wherein, a PCRF may subscribe to radio bearer loss information from the PDN gateway PGW or the GGSN, and the PDN gateway PGW or the GGSN subscribes to the radio bearer loss information from a network-side device after receiving the subscription from the PCRF.

Wherein, the network-side device in this embodiment may be the MME/SGSN/SGW.

Step 503: determining whether the release cause value indicates an abnormal release, and if so, the step 504 is performed, otherwise the process ends.

Step 504: reporting UE radio bearer loss information to a gateway while preserving all no-GBR bearers.

Wherein, the gateway may be the PGW or the GGSN. When the method of this embodiment is applied on the MME, at step 504, a radio bearer loss information is reported to the PGW by the MME through the SGW; when the method of this embodiment is applied on the SGW, at step 504, the radio bearer loss information is reported to the PGW by the SGW; and when the method of this embodiment is applied on the SGSN, at step 504, the radio bearer loss information is reported to the GGSN by the SGSN.

In this embodiment, there are no limits on the execution sequence of steps 502 and 503, for example, the release cause value can be determined and then it is determined whether the PGW/GGSN has subscribed the radio bearer loss information. This embodiment has no limits thereof.

With the method of reporting a radio bearer loss information provided in the embodiment of this invention, after a PGW/GGSN has subscribed to the radio bearer loss information, the message is reported to the PGW/GGSN, so that the problems of non-GBR bearer interrupting, no matter whether the service can endure radio-side bearer loss, which is caused by adopting a bearer release mechanism for non-GBR bearers to notify the gateway after receiving the radio bearer loss information by the network-side SGSN, and with a deployed PCC, notify the PCRF by the gateway; and of IP address releasing due to the release of the default bearer and thus the requirement of reattachment, can be solved.

In order to make the method of the embodiment of FIG. 5 clearer for understanding, the method of this embodiment will be described in detail in connection with the flow shown in FIGS. 6 and 7.

Figure 6:
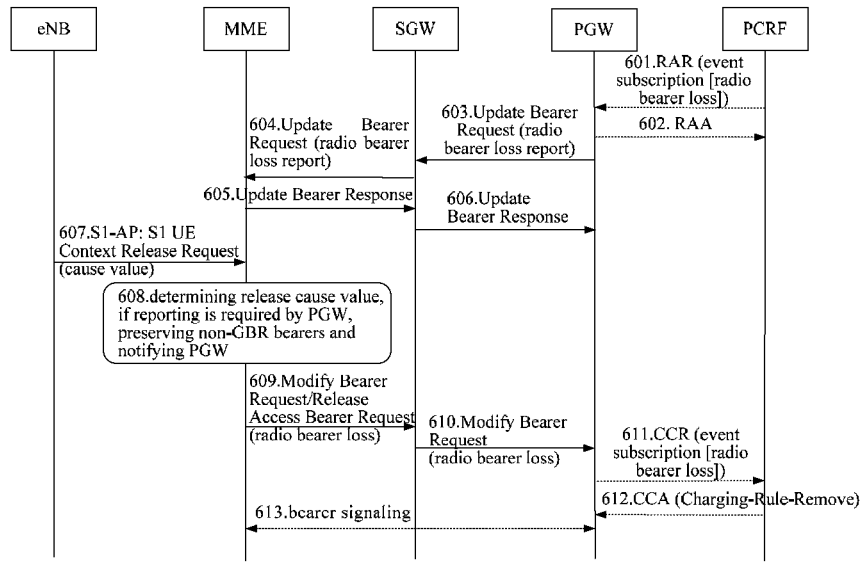
FIG. 6 is a flowchart of a first embodiment in which radio bearer loss information is reported by a MME according to the method shown in FIG. 5.

FIG. 6 is a flowchart of one embodiment, in which a MME determines whether to report according to a radio bearer loss information report request from a PGW. This embodiment directs to the EPS (Evolved Packet System, evolved packet system) defined by the 3GPP standard organization, with the eUTRAN as a radio access technique. Referring to FIG. 6, the flow comprises the following steps:

Steps 601-602: a PCRF subscribes to radio bearer loss information from a PGW, wherein the PGW comprises a PCEF (Policy and Charging Enforcement Function, policy and charging enforcement function). In this embodiment, unless specially stated, the PGW refers to an entity including the PCEF.

Wherein, the LOSS_OF_BEARER information that has been defined can be reused as information value, or new information can be specifically defined for radio bearer loss. The information may direct to a complete IP-CAN session, or to a specific rule, and this invention does not have limits thereof.

Step 603: after receiving the Subscribe Radio Bearer Loss Information request of PCRF, the PGW sends an Update Bearer Request (update bearer request) message to the SGW, requesting the MME to report the information to the PGW after the MME detects radio bearer loss.

Wherein, if the radio bearer loss information subscribed to by the PCRF directs to the complete IP-CAN session, requesting radio bearer loss from the MME involves all non-GBR bearers; if the information subscribed to by the PCRF directs to certain PCC rules, the PGW can still select to request radio bearer loss for all non-GBR bearers from the MME, or to request radio bearer loss for specific non-GBR bearers, which are bound to the above PCC rules, from the MME.

For example, the PCRF has subscribed to against PCC rule 1, the PGW finds that PCC rule 1 is bound to a non-GBR bearer 2, requesting radio bearer loss may merely refer to non-GBR bearer 2.

Steps 604-606: the SGW sends an Update Bearer Request (update Bearer request) message to the MME, requiring the MME to report the information after detecting radio bearer loss.

Step 607: if an eNB detects that a signaling connection to a UE (User Equipment) and all radio bearers need to be released, a S1 UE Context Release Request message (context release request) is send to the MME.

Wherein, a release cause value is carried in the message to indicate the reason for release, such as radio connection with UE lost, management maintenance cause, user inactivity, and repeated unsuccessful integrity checks with the UE, etc. When the release cause value is any one of the radio connection with UE lost, the management maintenance cause, or the repeated unsuccessful integrity checks with the UE, etc, an abnormal release can be confirmed.

Step 608: after receiving the UE Context Release Request message, the MME first determines whether the PGW has subscribed to a radio bearer loss information, and then determine whether to report according to the release cause value; if the PGW requests the MME to report a radio bearer loss information and the release cause value indicates an abnormal release, that is, the release cause value is any one of the radio connection with UE lost, the management maintenance cause, or the repeated unsuccessful integrity checks with the UE, etc, the MME report a radio bearer loss information to the PGW through the SGW, while all non-GBR bearers are still preserved.

Step 609: the MME sends a Modify Bearer Request (modify bearer request) message or a Release Access Bearer Request (release access bearer request) message to the SGW (servicing gateway), wherein UE radio bearer loss information is carried in the message.

Wherein, the radio bearer loss information may be only a general statement, i.e., without distinguishing particular release causes, or it may further carry a cause value to indicate the particular reason for the radio bearer loss. In this embodiment, according to the granularity of radio bearer loss requested by the PGW, the radio bearer loss information may direct to all non-GBR bearers of the UE, or one special non-GBR bearer.

Step 610: after receiving the Modify Bearer Request message or the Release Access Bearer Request message, if there is a UE radio bearer loss information carried therein, the SGW notifies the UE radio bearer loss information to the PGW (PDN gateway) through a Modify Bearer Request (modify bearer request) message.

Step 611: after receiving the Modify Bearer Request message, the PGW reports the radio bearer loss information to the PCRF through a CCR (Credit Control Request, credit control request) message, and if it directs to a special PPC rule (rule), the rule affected is reported through a Charging-Rule-Report (charging-rule-report) parameter in the CCR message.

Step 612: after receiving the radio bearer loss information, the PCRF may notify AF that underlying transport is interrupted; and if some services cannot be provided due to the radio bearer loss, the PCRF may notify the PGW to remove PCC rules corresponding to these services through a CCA (Credit Control Answer) message. Particularly, the PGW is notified to remove these PCC rules through a Charging-Rule-Remove (charging-rule-remove) parameter in the CCA message.

Step 613: if the PCRF requests to release some PCC rules, according to a new result of bearer binding, the PGW may optionally initiate some bearer operations, such as updating some bearers; and if a non-default bearer has its all rules released, a bearer release operation can be initiated.

Note that although this embodiment has described a PGW subscription to a MME, it is also applicable to a PGW requesting the report of a radio bearer loss information to a SGW (referring to the embodiment shown in FIG. 3), in which case, according to the PGW request, the SGW notifies the PGW in an abnormal release of radio bearers. Also, this embodiment is also applicable when a GGSN reports a radio bearer loss information to a SGSN (referring to the embodiment shown in FIG. 4), wherein the SGSN, according to a request of the GGSN, notifies the GGSN in an abnormal release of radio bearers, which will not be described in detail for simplicity.

Thus, the MME can determine whether to report according to a subscription request of the PGW (the subscription request can be initiated from a PCRF).

Figure 7:
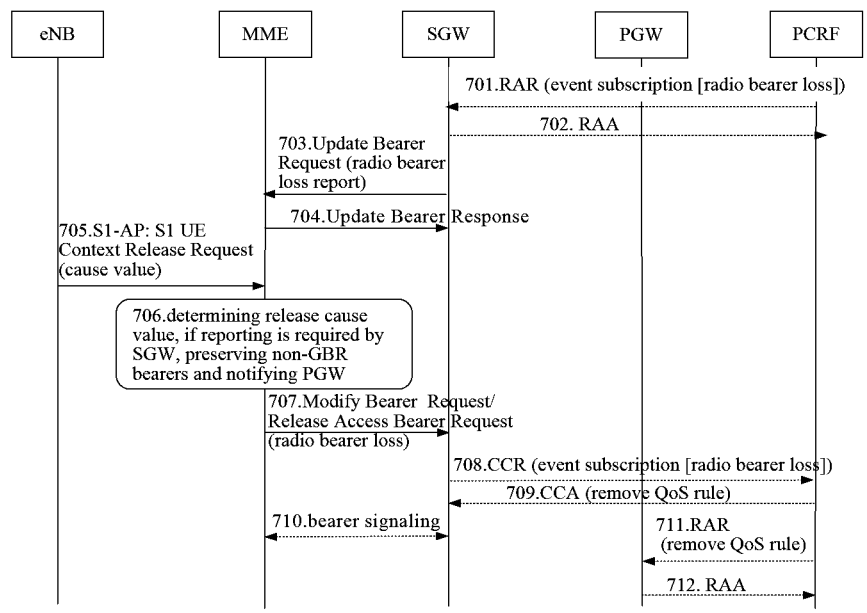
FIG. 7 is a flowchart of a second embodiment in which radio bearer loss information is reported by a MME according to the method shown in FIG. 5.

FIG. 7 is a flowchart of another embodiment, in which a MME determines whether to report according to a radio bearer loss information report request of a PGW. This embodiment directs to the EPS (Evolved packet System) defined by the 3GPP standard organization, with the eUTRAN as a radio access technique. Different to the flow shown in FIG. 6, instead of the GTP (GPRS Tunneling Protocol, GPRS tunneling protocol), the PMIP (Proxy Mobile IP, proxy mobile IP) protocol is adopted between the SGW and the PGW. In such a case, the PGW is unable to request the MME to report radio bearer loss through the PMIP protocol or execute bearer binding, and these functions are realized by the SGW including a BBERF (Bearing Binding and Event Report Function, bearing binding and event report function). Referring to FIG. 7 the flow comprises the following steps:

Steps 701-702: a PCRF subscribes to radio bearer loss information from the SGW. In this embodiment, unless specially stated, the SGW refers to an entity including the BBERF.

Wherein, the LOSS_OF_BEARER information that has been defined can be reused for information value, or new information can be defined specifically for radio bearer loss. The information may direct to a complete IP-CAN session, or a specific rule, and this invention does not have limits thereof.

Steps 703-704: after receiving the Subscribe Radio Bearer Loss Information request, the SGW sends an Update Bearer Request (update bearer request) message to the MME, requesting the MME to report the information to the PCEF after detecting the loss of radio bearers.

Wherein, if the radio bearer loss information subscribed to by the PCRF directs to the complete session, requesting a radio bearer loss information from the MME involves all non-GBR bearers. If the radio bearer loss information subscribed to by the PCRF directs to some QoS rules, the SGW can still select to request radio bearer loss for all non-GBR bearers from the MME, or to request radio bearer loss for a specific non-GBR bearers, which are bound to the above QoS rules, from the MME.

Step 705: if an eNB detects that a signaling connection to a UE (user equipment) and all radio bearers need to be released, a S1 UE Context Release Request (context release request) message is send to the MME.

Wherein, a release cause value carried in the information is used for indicating the reason for release, such as radio connection with UE lost, management maintenance cause, user inactivity, and repeated unsuccessful integrity checks with the UE, etc. When the release cause value is any one of the radio connection with UE lost, the management maintenance cause, or the repeated unsuccessful integrity checks with the UE, etc, an abnormal release can be confirmed.

Step 706: after receiving the UE Context Release Request message, the MME first determines whether the PGW has subscribed to radio bearer loss information, and then determines whether to report according to the release cause value. If the SGW requests the MME to report a radio bearer loss information and the release cause value indicates an abnormal release, that is, a release cause value other than user inactivity (user inactivity), the MME reports a radio bearer loss information to a gateway, while all non-GBR bearers are still preserved.

Step 707: the MME sends a Modify Bearer Request (modify Bearer request) message or a Release Access Bearer Request (Release Access Bearers Request) message to the SGW.

Wherein, the UE radio bearer loss information is carried in the information. The radio bearer loss information may be a general statement, i.e., without distinguishing particular release causes, or it may further carry a cause value to indicate a particular cause of the loss of radio bearers. In this embodiment, according to the granularity of radio bearer loss requested by the PGW, the radio bearer loss information may direct to all non-GBR bearers of the UE, or one specific non-GBR bearer.

Step 708: after receiving the Modify Bearer Request message, the SGW reports the radio bearer loss information to the PCRF through a CCR (Credit Control Request, credit control request) message; and if it directs to a specific QoS rule, the rule affected is reported through a Charging-Rule-Report parameter in the CCR message.

Step 709: after receiving the radio bearer loss information, the PCRF may notify AF that underlying transport is interrupted, and if some services cannot be resumed due to the radio bearer loss, the PCRF may notify the SGW to remove PCC rules and Qos rules corresponding to these services through a CCA (Credit Control Answer) message. Particularly, the SGW is notified to remove these PCC rules and QoS rules through a Charging-Rule-Remove (charging-rule-remove) parameter in the CCA message.

Step 710: if the PCRF requests to release (i.e., to remove) some QoS rules, the SGW may optionally initiate some bearer operations according to a new result of bearer binding, such as updating some bearers; and if a non-default bearer has its all rules released, a bearer release operation can be initiated (for a default bearer, it cannot be released).

Steps 711-712: the PCRF requests the PGW (including a PCEF) to remove the PCC rules.

Thus, the MME can determine whether to report according to a subscription request of the SGW (the subscription request can be initiated from the PCRF).

In the embodiments shown in FIGS. 6 and 7, if there is no a PCC deployed, the dashed-line steps are not present.

With the method of reporting a radio bearer loss information provided in the embodiment of this invention, the problems of non-GBR bearer interrupting, no matter whether the service can endure radio-side bearer loss, which is caused by adopting a bearer release mechanism for non-GBR bearers to notify a gateway after receiving a radio bearer loss information by a MME, and with a deployed PCC, notify the PCRF by the gateway; and of IP address releasing due to the release of a default bearer and thus the requirement of reattachment, can be solved.

Figure 8:
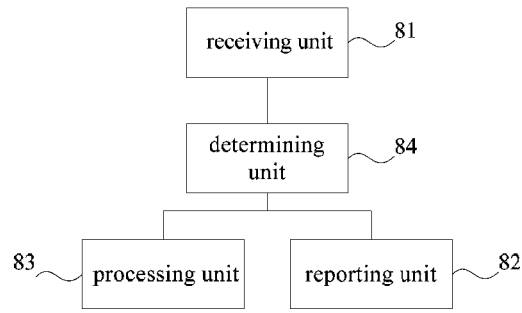
FIG. 8 is a component block diagram of a MME provided in an embodiment of this invention.

FIG. 8 is a component block diagram of a Moving Management Entity MME provided in an embodiment of this invention. Referring to FIG. 8, the MME comprises:

a receiving unit 81, configured to receive a UE Context Release Request message carrying a release cause value sent by an Evolved Node B eNB.

Wherein, the release cause value is used to indicate a release cause, such as radio connection with UE lost, management maintenance cause, user inactivity, or repeated unsuccessful integrity checks with the UE, etc. When the release cause value is any one of the radio connection with UE lost, the management maintenance cause, or the repeated unsuccessful integrity checks with the UE, etc, an abnormal release can be confirmed.

a reporting unit 82, configured to report radio bearer loss information to a PGW through a SGW when the release cause value indicates an abnormal release;

a processing unit 83, configured to preserve non-GBR bearers when the release cause value indicates an abnormal release.

Wherein, when a device on the radio access network side (such as eNB) detects that it is necessary to release a radio signaling connection to a UE and all radio bearers, it sends a UE Context Release Request message carrying a release cause value to a network-side device (such as a MME) to notify the MME of the interruption of the connection to that UE. At that point, after receiving the corresponding UE Context Release message carrying the release cause value, the MME determines whether to report a radio bearer loss information according to the release cause value, Wherein, if the release cause value is any one of the radio connection with UE lost, the management maintenance cause, or the repeated unsuccessful integrity checks with the UE, etc, a radio bearer loss information for the UE is reported to a PGW through a SGW, while all non-GBR bearers are still preserved on the MME.

In one embodiment, the report unit 82 is particularly used to send a Modify Bearer Request message or a Release Access Bearer Request message both carrying radio bearer loss information to a SGW, so as to send the Modify Bearer Request message carrying radio bearer loss information to a PGW through the SGW.

In one embodiment, the MME may further comprise:
a determining unit 84, configured to determine whether a radio bearer loss information is subscribed to by the PGW after receiving the UE Context Release message carrying a release cause sent by the Evolved Node B eNB; if the radio bearer loss information is subscribed to by the PGW, determining whether the release cause value is an abnormal release, and reporting the result of the determination to the reporting unit 82 and the processing unit 83.

Various components of the MME of this embodiment are used to implement steps of the method in the embodiment shown in FIG. 2 respectively. Because each of those steps has been described in detail in the embodiment shown in FIG. 2, they will not be repeated herein.

With the MME provided in this embodiment, the problems of non-GBR bearer interrupting, no matter whether the service can endure bearer loss on the radio side, which is caused by adopting a bearer release mechanism for non-GBR bearers to notify a gateway after receiving a radio bearer loss information by a MME, and with a deployed PCC, notify a PCRF by the gateway; and of IP address releasing due to the release of the default bearer and thus the requirement of reattachment, can be solved.

Figure 9:
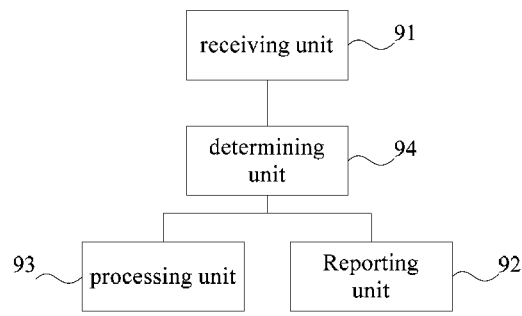
FIG. 9 is a component block diagram of a SGW provided in an embodiment of this invention.

FIG. 9 is a component block diagram of a Servicing gateway SGW provided in an embodiment of this invention. Referring to FIG. 9, the SGW comprises:
a receiving unit 91, configured to receive a Release Access Bearer Request message carrying a release cause value sent by a MME.

Wherein, the release cause value is used to indicate a release cause, such as radio connection with UE lost, management maintenance cause, user inactivity, or repeated unsuccessful integrity checks with the UE, etc. When the release cause value is any one of the radio connection with UE lost, the management maintenance cause, or the repeated unsuccessful integrity checks with the UE, etc, an abnormal release can be confirmed.
a reporting unit 92, configured to report radio bearer loss information to a PGW when the release cause value indicates an abnormal release;
a processing unit 93, configured to preserve all non-GBR bearers when the release cause value indicates an abnormal release.

Wherein, after receiving a corresponding UE Context Release Message carrying a release cause value, instead of reporting radio bearer loss information, the MME forwards the release cause value to the SGW through a Release Access Bearer Request message, and it is the SGW which then performs the reporting of the radio bearer loss information.

Wherein, after receiving the Release Access Bearer Request message carrying a release cause value, the SGW determines whether to report radio bearer loss information according to the release cause value. Wherein for an abnormal release, that is, if the release cause value is any one of the radio connection with UE lost, the management maintenance cause, or the repeated unsuccessful integrity checks with the UE, etc, a radio bearer loss information for the UE is reported to a PGW, while all non-GBR bearers are still preserved on the SGW.

In one embodiment, the reporting unit 92 is particularly used to send a Modify Bearer Request message carrying radio bearer loss information to a PGW.

In one embodiment, the SGW may further comprise:
a determining unit 94, configured to determine whether a radio bearer loss information is subscribed to by the PGW after receiving the Release Access Bearer Request message carrying a release cause value sent by the MME; if the radio bearer loss information is subscribed to by the PGW, determining whether the release cause value is an abnormal release; and reporting the result of the determination to the reporting unit 92 and the processing unit 93.

Various components of the SGW of this embodiment are used to implement steps of the method in the embodiment shown in FIG. 3 respectively. Because each of those steps has been described in detail in the embodiment shown in FIG. 3, they will not be repeated herein.

With the SGW provided in this embodiment, the problems of non-GBR bearer interrupting, no matter whether the service can endure bearer loss on the radio side, which is caused by adopting a bearer release mechanism for non-GBR bearers to notify a gateway after receiving a radio bearer loss information by a MME, and with a deployed PCC, notify a PCRF by the gateway; and of IP address releasing due to the release of the default bearer and thus the requirement of reattachment, can be solved.

Figure 10:
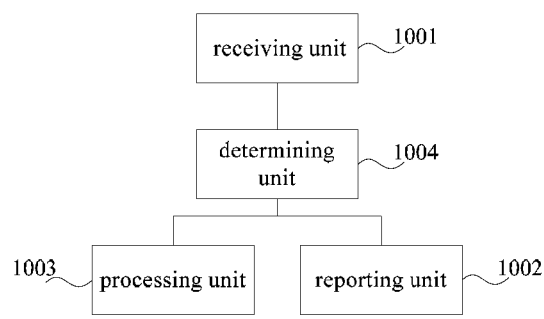
FIG. 10 is a component block diagram of a SGSN provided in an embodiment of this invention.

FIG. 10 is a component block diagram of a Serving GPRS support Node SGSN provided in an embodiment of this invention. Referring to FIG. 10, the SGSN comprises:
a receiving unit 1001, configured to receive a Iu Interface Release Request message carrying a release cause value sent by a RNC.

Wherein, the release cause value is used to indicate the reason for release, such as radio connection with UE lost, management maintenance cause, user inactivity, or repeated unsuccessful integrity checks with the UE, etc. When the release cause value is any one of the radio connection with UE lost, the management maintenance cause, or the repeated unsuccessful integrity checks with the UE, etc, an abnormal release can be confirmed.
a reporting unit 1002, configured to report radio bearer loss information to a gateway when the release cause value indicates an abnormal release;
a processing unit 1003, configured to preserve all non-GBR bearers when the release cause value indicates an abnormal release.

In this embodiment, when a device on the radio access network side (such as RNC) detects that it is necessary to release a radio signaling connection to a UE and all radio bearers, it sends a Iu Interface Release Request message carrying a release cause value to the network-side device (such as SGSN) to notify the SGSN that a radio connection to the UE has been interrupted. At that point, after receiving the Iu Interface Release Request message, the SGSN performs the reporting of radio bearer loss information.

Wherein, after receiving the Iu Interface Release Request message carrying a release cause value, the SGSN determines whether to report radio bearer loss information according to the release cause value. Wherein for an abnormal release, that is, if the release cause value is any one of the radio connection with UE lost, the management maintenance cause, or the repeated unsuccessful integrity checks with the UE, etc, radio bearer loss information for the UE is reported to a GGSN, while all non-GBR bearers are still preserved on the SGSN.

In one embodiment, the report unit 1002 is particularly used to send an Update PDP Context Request message carrying radio bearer loss information to the Gateway GPRS support Node GGSN.

In one embodiment, the SGSN may further comprise:
a determining unit 1004, configured to determine whether a radio bearer loss information is subscribed to by the GGSN after the receiving unit 1001 has received the Iu Interface Release Request message carrying a release cause value sent by the Radio Network Controller RNC; if the radio bearer loss information is subscribed to by the GGSN, determining whether the release cause value is an abnormal release, and reporting the result of the determination to the reporting unit 1002 and the processing unit 1003.

Various components of the SGSN of this embodiment are used to implement steps of the method in the embodiment shown in FIG. 4 respectively. Because each of those steps has been described in detail in the embodiment shown in FIG. 4, they will not be repeated herein.

With the SGSN provided in this embodiment, the problems of non-GBR bearer interrupting, no matter whether the service can endure bearer loss on the radio side, which is caused by adopting a bearer release mechanism for non-GBR bearers to notify a gateway after receiving a radio bearer loss information by a GGSN, and with a deployed PCC, notify a PCRF by the gateway; and of IP address releasing due to the release of the default bearer and thus the requirement of reattachment, can be solved.

Steps of methods or algorithms described with reference to embodiments disclosed herein can be implemented in hardware directly, software modules executed on a processor, or a combination thereof. Software modules can be placed in Random Access Memory (RAM), Read Only Memory (ROM), electrically programmable ROM, electrically erasable and programmable ROM, registers, hard disks, removable magnetic disks, CD-ROMs, or any other storage mediums well known by those skilled in the art.

The objects, technical solutions and beneficial effects of present invention have been described in further detail with the above particular embodiments. It should be understood that the above are merely specific embodiments of the present invention, but is not intended to limit the scope of this invention. Any modifications, equivalent alternatives, or improvements are also covered in the scope of embodiments of this invention as falling within the spirit and principle of embodiments of this invention.

What is claimed is:

1. A radio bearer loss information reporting method, comprising:
receiving a release cause value indicating an abnormal release and carried by one of: a user equipment (UE) context release request message, a release access bearer request message, and an Iu interface release request message; and
reporting radio bearer loss information to a gateway while preserving non-guaranteed bandwidth (non-GBR) bearers and releasing guaranteed bandwidth (GBR) bearers,
wherein the abnormal release occurs when the release cause value is one of a lost radio connection with the UE, a management maintenance cause, and repeated unsuccessful integrity checks with the UE.

2. The method according to claim 1, wherein the method is applied on a mobility management entity (MME), and
the receiving one of the user equipment (UE) context release request message, the release access bearer request message, and the Iu interface release request message, comprises receiving, from an evolved Node B (eNB), the user equipment (UE) context release request message carrying the release cause value.

3. The method according to claim 2, wherein the reporting radio bearer loss information to the gateway comprises:
sending, to a servicing gateway (SGW), one of: a modify bearer request message carrying the radio bearer loss information and the release access bearer request message carrying the radio bearer loss information;
wherein when a modify bearer request message carrying the radio bearer loss information is sent to the SGW, the modify bearer request message is sent to a packet data network (PDN) gateway (PGW) through the SGW.

4. The method according to claim 1, wherein the method is applied on a serving gateway (SGW), and
wherein the release cause value is carried by a release access bearer request message sent by a mobility management entity (MME).

5. The method according to claim 4, wherein the reporting radio bearer loss information to the gateway comprises sending a modify bearer request message carrying the radio bearer loss information to a packet data network (PDN) gateway (PGW).

6. The method according to claim 1, wherein the method is applied on a serving General Packet Radio Service (GPRS) support Node (SGSN), and
wherein the release cause value is carried by
an Iu interface Release Request message from a radio network controller.

7. The method according to claim 6, wherein the reporting the radio bearer loss information to the gateway comprises sending an update Packet Data Protocol (PDP) context request message carrying the radio bearer loss information to a gateway GPRS support Node (GGSN).

8. A mobility management entity (MME), comprising:
a receiving unit, configured to receive, from an evolved Node B (eNB), a user equipment (UE) context release request message carrying a release cause value that indicates an abnormal release;
a reporting unit, configured to report radio bearer loss information to a gateway; and
a processing unit, configured to preserve non-guaranteed bandwidth (non-GBR) bearers while releasing guaranteed bandwidth (GBR) bearers,
wherein the abnormal release occurs when the release cause value is one of a lost radio connection with the UE, a management maintenance cause, and repeated unsuccessful integrity checks with the UE.

9. The MME according to claim 8, wherein the reporting unit is configured to send one of:
a modify bearer request message carrying the radio bearer loss information to a serving gateway (SGW) for forwarding to a packet data network (PDN) gateway (PGW), and
a release access bearer request message carrying the radio bearer loss information to a serving gateway (SGW).

10. A serving gateway (SGW), comprising:
a receiving unit, configured to receive a release access bearer request message carrying a release cause value that indicates an abnormal release sent by a mobility management entity (MME);
a reporting unit, configured to report radio bearer loss information to a packet data network (PDN) gateway (PGW); and
a processing unit, configured to preserve non-guaranteed bandwidth (non-GBR) bearers while releasing guaranteed bandwidth (GBR) bearers,
wherein the abnormal release occurs when the release cause value is one of a lost radio connection with the UE, a management maintenance cause, and repeated unsuccessful integrity checks with the UE.

11. A serving General Packet Radio Service (GPRS) support Node (SGSN), comprising:

a receiving unit, configured to receive an Iu interface release request message carrying a release cause value that indicates an abnormal release sent by a radio network controller (RNC);

a reporting unit, configured to report radio bearer loss information to a gateway; and a processing unit, configured to preserve non-guaranteed bandwidth (non-GBR) bearers while releasing guaranteed bandwidth (GBR) bearers, wherein the abnormal release is one of the group consisting of: a lost radio connection with a user equipment (UE), a management maintenance cause, and repeated unsuccessful integrity checks with the UE, and wherein the SGSN is further configured to release guaranteed bandwidth (GBR) bearers.

12. The SGSN according to claim 11, wherein the reporting unit is configured to send an update Packet Data Protocol (PDP) context request message carrying the radio bearer loss information to a gateway GPRS support Node (GGSN).

* * * * *

UNITED STATES PATENT AND TRADEMARK OFFICE
CERTIFICATE OF CORRECTION

PATENT NO.         : 9,060,305 B2
APPLICATION NO.    : 13/727261
DATED              : June 16, 2015
INVENTOR(S)        : Li et al.

Page 1 of 1

It is certified that error appears in the above-identified patent and that said Letters Patent is hereby corrected as shown below:

In the claims

Column 17, lines 10-11, -- the group consisting of -- should be removed.

Signed and Sealed this
Fifteenth Day of December, 2015

Michelle K. Lee
*Director of the United States Patent and Trademark Office*